United States Patent
Ohsaka

(10) Patent No.: US 10,229,763 B2
(45) Date of Patent: Mar. 12, 2019

(54) NEUTRON FLUX MAPPING SYSTEM AND CONTROL METHOD FOR NEUTRON FLUX MAPPING SYSTEM

(71) Applicant: Mitsubishi Electric Corporation, Chiyoda-ku (JP)

(72) Inventor: Kenji Ohsaka, Osaka (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 1419 days.

(21) Appl. No.: 13/914,661

(22) Filed: Jun. 11, 2013

(65) Prior Publication Data

US 2014/0192944 A1     Jul. 10, 2014

(30) Foreign Application Priority Data

Jan. 9, 2013 (JP) .................................. 2013-001732

(51) Int. Cl.
     *G21C 17/108*     (2006.01)

(52) U.S. Cl.
     CPC .................................. *G21C 17/108* (2013.01)

(58) Field of Classification Search
     CPC combination set(s) only.
     See application file for complete search history.

(56) References Cited

U.S. PATENT DOCUMENTS

| | | | | |
|---|---|---|---|---|
| 5,078,956 A | * | 1/1992 | Lunz | G21C 17/108 376/245 |
| 2005/0154478 A1 | * | 7/2005 | Song | G21C 17/108 700/57 |
| 2013/0266110 A1 | * | 10/2013 | Yanagisawa et al. | 376/258 |

FOREIGN PATENT DOCUMENTS

| | | |
|---|---|---|
| JP | 59-116097 A | 7/1984 |
| JP | 61-110091 A | 5/1986 |
| JP | 62-105085 A | 5/1987 |

* cited by examiner

*Primary Examiner* — Lily C Garner
(74) *Attorney, Agent, or Firm* — Buchanan Ingersoll & Rooney PC

(57) ABSTRACT

Provided are a neutron detector for detecting a neutron flux distribution of the inside of a reactor, a drive cable connected to the neutron detector, a drive unit for driving the drive cable, a plurality of guide thimbles provided being inserted from the outside of the reactor into the reactor, for inserting the neutron detector, a storage tube for storing the neutron detector, a path transfer device connected to the drive unit, for selecting one of insertion of the neutron detector into each of the guide thimbles and insertion of the neutron detector into the storage tube, and an inspection guide tube connecting the drive unit and the storage tube. The drive unit has a switching unit for switching between the path transfer device side and the inspection guide tube side.

6 Claims, 3 Drawing Sheets

NEUTRON FLUX MAPPING SYSTEM AND CONTROL METHOD FOR NEUTRON FLUX MAPPING SYSTEM

BACKGROUND OF THE INVENTION

1. Field of the Invention

The present invention relates to a neutron flux mapping system and a control method for a neutron flux mapping system that, in the case where a neutron detector is used again, allow a worker to inspect each apparatus while being prevented from being exposed to radiation.

2. Description of the Background Art

In a conventional neutron flux mapping system, a neutron detector is replaced with a new neutron detector upon every periodic inspection work. Upon this replacement, a drive cable connected to the neutron detector is cut such that a slightly long portion from the tip thereof inserted into a reactor, including a portion with a high dose rate, is left in a storage tube. Then, the neutron detector with a high dose rate is stored in the storage tube. Since the rest of the drive cable is a portion that is not inserted into a reactor, the rest of the drive cable has almost no dose. Therefore, the rest of the drive cable is rolled up into a drive unit, detached by a worker with its hand, and then discarded (for example, see Patent Document 1).

Recently, the quality of a neutron detector is improved and can be used for a long period. Therefore, in a neutron flux mapping system, a neutron detector may be used again, instead of replacing the neutron detector with a new neutron detector upon every periodic inspection. In this case, the neutron detector is rolled up into a drive unit, detached by a worker with the hand, and then stored in another place.

Patent Document 1: Japanese Laid-Open Patent Publication No. 62-105085

Conventionally, a neutron detector is rolled up into a drive unit, detached by hand, and then stored in another place. Meanwhile, a path transfer device and the like are inspected. After the inspection is completed, the neutron detector with a high dose rate is returned to the drive unit. Since a neutron detector that has been used in one cycle (one cycle=a period from a periodic inspection to the next periodic inspection) has a high dose rate, there is a problem of causing risk of radiation exposure.

SUMMARY OF THE INVENTION

The present invention has been made to solve the above problem, and an object of the present invention is to provide a neutron flux mapping system and a control method for a neutron flux mapping system that, in the case where a neutron detector is used again, allow a worker to inspect each apparatus while being prevented from being exposed to radiation.

A neutron flux mapping system according to the present invention is a neutron flux mapping system placed inside a containment vessel, for detecting a neutron flux distribution of the inside of a reactor. The neutron flux mapping system includes: a neutron detector for detecting the neutron flux distribution of the inside of the reactor; a drive cable connected to the neutron detector, for moving the neutron detector; a drive unit for driving the drive cable; a plurality of guide thimbles provided being inserted from the outside of the reactor into a plurality of sections inside the reactor, for respectively inserting the neutron detector into the plurality of sections inside the reactor; a storage tube for storing the neutron detector outside the reactor; a path transfer device connected to the drive unit, for selecting one of insertion of the neutron detector into each of the guide thimbles and insertion of the neutron detector into the storage tube; a storage guide tube connecting the path transfer device and the storage tube; and an inspection guide tube connecting the drive unit and the storage tube. The drive unit has a switching unit for switching a path to one of the path transfer device side and the inspection guide tube side.

In addition, a control method for a neutron flux mapping system according to the present invention is a control method for a neutron flux mapping system including: a neutron detector for detecting a neutron flux distribution of the inside of a reactor; a drive cable connected to the neutron detector, for moving the neutron detector; a drive unit for driving the drive cable; a plurality of guide thimbles provided being inserted from the outside of the reactor into a plurality of sections inside the reactor, for respectively inserting the neutron detector into the plurality of sections inside the reactor; a storage tube for storing the neutron detector outside the reactor; a path transfer device connected to the drive unit, for selecting one of insertion of the neutron detector into each of the guide thimbles and insertion of the neutron detector into the storage tube; a storage guide tube connecting the path transfer device and the storage tube; and an inspection guide tube connecting the drive unit and the storage tube. The drive unit has a switching unit for switching a path to one of the path transfer device side and the inspection guide tube side. The control method includes: a storage step of switching the path to the path transfer device side by the switching unit, selecting the storage guide tube by the path transfer device, and moving and storing the neutron detector into the storage tube via the storage guide tube by the drive cable; a movement step of moving the neutron detector into the drive unit via the path transfer device by the drive cable; and a preparation step of switching the path to the inspection guide tube side by the switching unit, moving the neutron detector into the storage tube via the inspection guide tube from the inside of the drive unit by the drive cable, and performing inspection preparation.

In addition, a control method for a neutron flux mapping system according to the present invention is a control method for a neutron flux mapping system including: a neutron detector for detecting a neutron flux distribution of the inside of a reactor; a drive cable connected to the neutron detector, for moving the neutron detector; a drive unit for driving the drive cable; a plurality of guide thimbles provided being inserted from the outside of the reactor into a plurality of sections inside the reactor, for respectively inserting the neutron detector into the plurality of sections inside the reactor; a storage tube for storing the neutron detector outside the reactor; a path transfer device connected to the drive unit, for selecting one of insertion of the neutron detector into each of the guide thimbles and insertion of the neutron detector into the storage tube; a storage guide tube connecting the path transfer device and the storage tube; and an inspection guide tube connecting the drive unit and the storage tube. The drive unit has a switching unit for switching a path to one of the path transfer device side and the inspection guide tube side. The neutron flux mapping system further includes: a control cabinet provided outside the containment vessel, for controlling the drive unit, the path transfer device, and the switching unit; and a control unit for maintenance provided inside the containment vessel, for controlling the drive unit, the path transfer device, and the switching unit upon inspection. The control method includes: a storage step of switching the path to the path transfer device side by the switching unit, selecting the storage guide tube by the path transfer device, and moving and storing the neutron detector into the storage tube via the storage guide tube by the drive cable; a movement step of moving the neutron detector into the drive unit via the path transfer device by the drive cable; and a preparation step of switching the path to the inspection guide tube side by the switching unit, moving the neutron detector into the storage tube via the inspection guide tube from the inside of the drive unit by the drive cable, and performing inspection preparation. Control for the storage step is performed by the control cabinet, and control for the movement step and the preparation step is performed by the control unit for maintenance.

Since the neutron flux mapping system according to the present invention is configured as described above and the control methods for a neutron flux mapping system according to the present invention are performed as described above, in the case where a neutron detector is used again, a worker can inspect each apparatus while being prevented from being exposed to radiation.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

Figure 1:
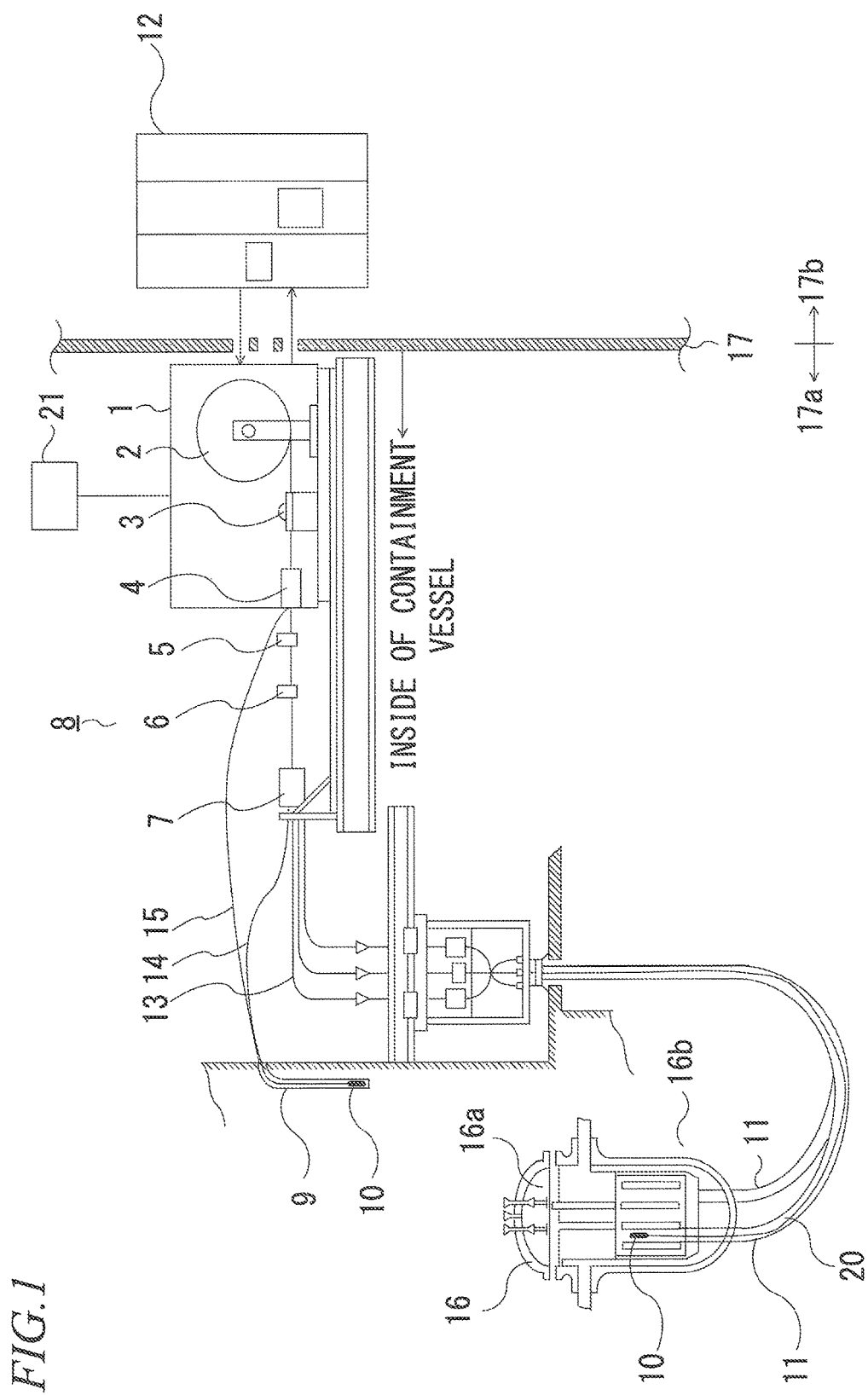
FIG. 1 is a diagram showing the configuration of a neutron flux mapping system according to the first embodiment of the present invention.

Hereinafter, embodiments of the present invention will be described. FIG. 1 is a diagram showing the configuration of a neutron flux mapping system according to the first embodiment of the present invention. In FIG. 1, the neutron flux mapping system of the present invention is placed in an inside 17a of the containment vessel 17. The neutron flux mapping system detects a neutron flux distribution of a reactor inside 16a of a reactor 16. The neutron flux mapping system includes a neutron detector 10, a drive cable 20, a drive unit 1, a plurality of guide thimbles 11, a storage tube 9, a path transfer device 8, a plurality of thimble connection tubes 13, a storage guide tube 14, an inspection guide tube 15, a control cabinet 12, and a control unit for maintenance 21.

The neutron detector 10 detects the neutron flux distribution of the reactor inside 16a of the reactor 16.

$^{235}$U (concentration of about 90% of $U_3O_8$) is applied to the inside of the neutron detector 10.

Therefore, when the neutron detector 10 is inserted into the reactor inside 16a during the operation of the reactor 16, the neutron detector 10 causes nuclear fission to have a high dose rate.

The drive cable 20 is connected to the neutron detector 10, for moving the neutron detector 10.

The drive unit 1 moves the neutron detector 10 by driving the drive cable 20.

The plurality of guide thimbles 11 are provided being inserted from a reactor outside 16b of the reactor 16 into a plurality of sections of the reactor inside 16a of the reactor 16, for inserting the neutron detector 10 into the plurality of sections of the reactor inside 16a of the reactor 16.

The plurality of thimble connection tubes 13 are respectively connected to the plurality of guide thimbles 11 via a sealed table or the like.

The storage tube 9 is used for storing the neutron detector 10 at the reactor outside 16b of the reactor 16.

In view of safety, the storage tube 9 is formed so as to be embedded in, for example, a shielding wall of the inside 17a of the containment vessel 17.

The path transfer device 8 selects insertion of the neutron detector 10 into each thimble connection tube 13, i.e., each guide thimble 11, or into the storage tube 9.

The storage guide tube 14 connects the path transfer device 8 and the storage tube 9.

The inspection guide tube 15 directly connects the drive unit 1 and the storage tube 9 not via another apparatus.

The drive unit 1 is composed of a drum 2, a wheel 3, and a switching unit 4 which are sequentially connected from the end side.

The drum 2 rolls up the drive cable 20 connected to the neutron detector 10, for rolling up the neutron detector 10.

The wheel 3 moves the drive cable 20 being inserted or extracted by the drum 2, for inserting or extracting the neutron detector 10.

One side of the switching unit 4 is connected to the exit side (reactor 16 side) of the drive unit 1, and the other side is connected to the wheel 3.

The switching unit 4 switches its path to the path transfer device 8 side or the inspection guide tube 15 side.

Figure 2:
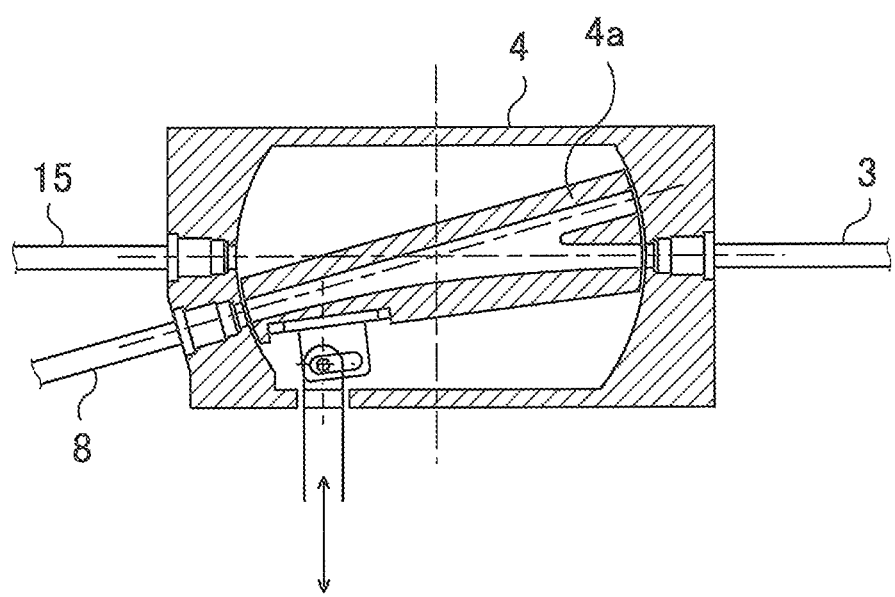
FIG. 2 is a diagram showing the configuration of a switching unit of the neutron flux mapping system shown in FIG. 1.

In the switching unit 4, for example, as shown in FIG. 2, one side of a switching path tube 4a is connected to the exit side of the drive unit 1 and the other side is connected to the wheel 3 side.

The switching unit 4 is configured to switch its path by moving a portion of the switching path tube 4a on the exit side of the drive unit 1 to the path transfer device 8 side or the inspection guide tube 15 side.

The path transfer device 8 is composed of a safety limit switch 5, a withdrawal limit switch 6, and a path selection unit 7 which are sequentially connected from the drive unit 1 side.

The path selection unit 7 switches and selects a path of the neutron detector 10.

The withdrawal limit switch 6 is a switch set as an origin (zero position) of the position of the neutron detector 10.

The withdrawal limit switch 6 operates until the neutron detector 10 passes therethrough, and is shut when the neutron detector 10 passes therethrough, so that the neutron detector 10 stops.

The safety limit switch 5 is a backup switch for the withdrawal limit switch 6.

When the withdrawal limit switch 6 has broken down or has failed to be shut, the safety limit switch 5 is shut when the neutron detector 10 passes therethrough, so that the neutron detector 10 stops.

The control cabinet 12 is provided at the outside 17b of the containment vessel 17 and controls the drive unit 1, the path transfer device 8, and the switching unit 4.

The control unit for maintenance 21 is provided at the inside 17a of the containment vessel 17 and controls the drive unit 1, the path transfer device 8, and the switching unit 4 upon inspection.

In FIG. 1, tubes other than the guide thimble 11, e.g., the thimble connection tube 13, the storage guide tube 14, the inspection guide tube 15, and the like are each shown by one line for convenience. Actually, they are formed in a tube-like shape so as to allow the drive cable 20 to move therethrough.

Next, the operation of the neutron flux mapping system of the first embodiment configured as described above will be described.

The case of measuring a neutron flux distribution of the reactor inside 16a of the reactor 16 will be described.

First, by control from the control cabinet 12, the path transfer device 8 selects a path in accordance with the one of the guide thimbles 11 into which the neutron detector 10 is to be inserted.

Then, the switching path tube 4a of the switching unit 4 switches its path to the path transfer device 8 side.

Next, the drive unit 1 sends out the drive cable 20, whereby the neutron detector 10 is inserted into the selected guide thimble 11 via the thimble connection tube 13.

Next, the neutron detector 10 measures the neutron flux distribution of the reactor inside 16a of the reactor 16.

Then, the measurement of the neutron flux distribution is finished.

Next, the case where the neutron detector 10 is stored at the reactor outside 16b of the reactor 16 will be described.

First, by control from the control cabinet 12, the drive unit 1 rolls up the drive cable 20, whereby the neutron detector 10 is moved to the position of the withdrawal limit switch 6.

Next, the path selection unit 7 selects a path to the storage guide tube 14.

Next, the drive unit 1 sends out the drive cable 20, whereby the neutron detector 10 is moved and stored into the storage tube 9 via the storage guide tube 14.

Next, the case of inspection such as periodic inspection will be described.

As described above, the neutron detector 10 is stored in the storage tube 9 via the storage guide tube 14.

Upon inspection, the inside 17a of the containment vessel 17 and the outside 17b of the containment vessel 17 are separated.

This is to prioritize safety.

Therefore, all connection lines connecting the drive unit 1 and the control cabinet 12 placed at the outside 17b of the containment vessel 17 are detached at connector sections.

Then, instead of the control cabinet 12, the control unit for maintenance 21 is connected to the drive unit 1.

The following operation is performed by the control unit for maintenance 21 controlling the drive unit 1, the path transfer device 8, the switching unit 4, and the like.

Next, by control from the control unit for maintenance 21, the drive unit 1 rolls up the drive cable 20 by using the wheel 3 and the drum 2.

Thus, the neutron detector 10 is extracted from the storage tube 9 and moves to the withdrawal limit switch 6 via the storage guide tube 14 and the path selection unit 7.

Then, when the neutron detector 10 has reached the position of the withdrawal limit switch 6, a distance indication of the neutron detector 10 becomes zero (0).

After this is confirmed, the neutron detector 10 is further extracted to pass through the safety limit switch 5.

The neutron detector 10 is further extracted to pass through the switching unit 4 on the exit side of the drive unit 1 and reach a position just before the wheel 3.

The distance of this extraction is assured by, for example, attaching a dummy neutron detector and recording a distance of each portion from the position of the withdrawal limit switch 6 as a reference (zero).

Next, the switching path tube 4a of the switching unit 4 switches its path from the path transfer device 8 side to the inspection guide tube 15 side.

Next, the drive unit 1 drives the drive cable 20, whereby the drive cable 20 is sent out to the inspection guide tube 15 via the drum 2, the wheel 3, and the switching unit 4.

Then, the neutron detector 10 is moved to the storage tube 9, and inspection preparation is performed.

In this state, each apparatus, e.g., the path selection unit 7, the withdrawal limit switch 6, the safety limit switch 5, and the like are inspected.

Next, the case where inspection is completed and the neutron detector 10 is stored at the reactor outside 16b of the reactor 16 again will be described.

First, the drive unit 1 drives the drive cable 20, whereby the neutron detector 10 is extracted from the storage tube 9 and the neutron detector 10 is moved to a position between the switching unit 4 and the wheel 3.

Next, the switching path tube 4a of the switching unit 4 switches its path from the inspection guide tube 15 side to the path transfer device 8 side.

Next, the path selection unit 7 selects a path to the storage guide tube 14.

Next, the drive unit 1 sends out the drive cable 20, whereby the neutron detector 10 is moved from the inside of the drive unit 1, through the safety limit switch 5, the withdrawal limit switch 6, the path selection unit 7, and the storage guide tube 14, to the storage tube 9, and then stored.

Next, the control unit for maintenance 21 is detached from the drive unit 1.

Next, the control cabinet 12 is connected to the drive unit 1, to return to the normal control state.

According to the neutron flux mapping system and the control method for a neutron flux mapping system of the first embodiment configured as described above, since the inspection guide tube directly connected from the drive unit to the storage tube is provided, by control of the drive unit, the neutron detector can be stored in the storage tube without passing through apparatuses other than the drive unit. Thus, it becomes possible to disassemble and inspect each apparatus in the path transfer device such as the safety limit switch, the withdrawal limit switch, and the path selection unit. In addition, in the case where the neutron detector is used again, work can be performed without causing a worker to touch the neutron detector. Therefore, the worker is freed from risk of radiation exposure.

In addition, the control cabinet performs control in a process of storing the neutron detector, and the control unit for maintenance performs control in a process of moving or preparing the neutron detector. Therefore, inspection can be performed with high safety.

Second Embodiment

Figure 3:
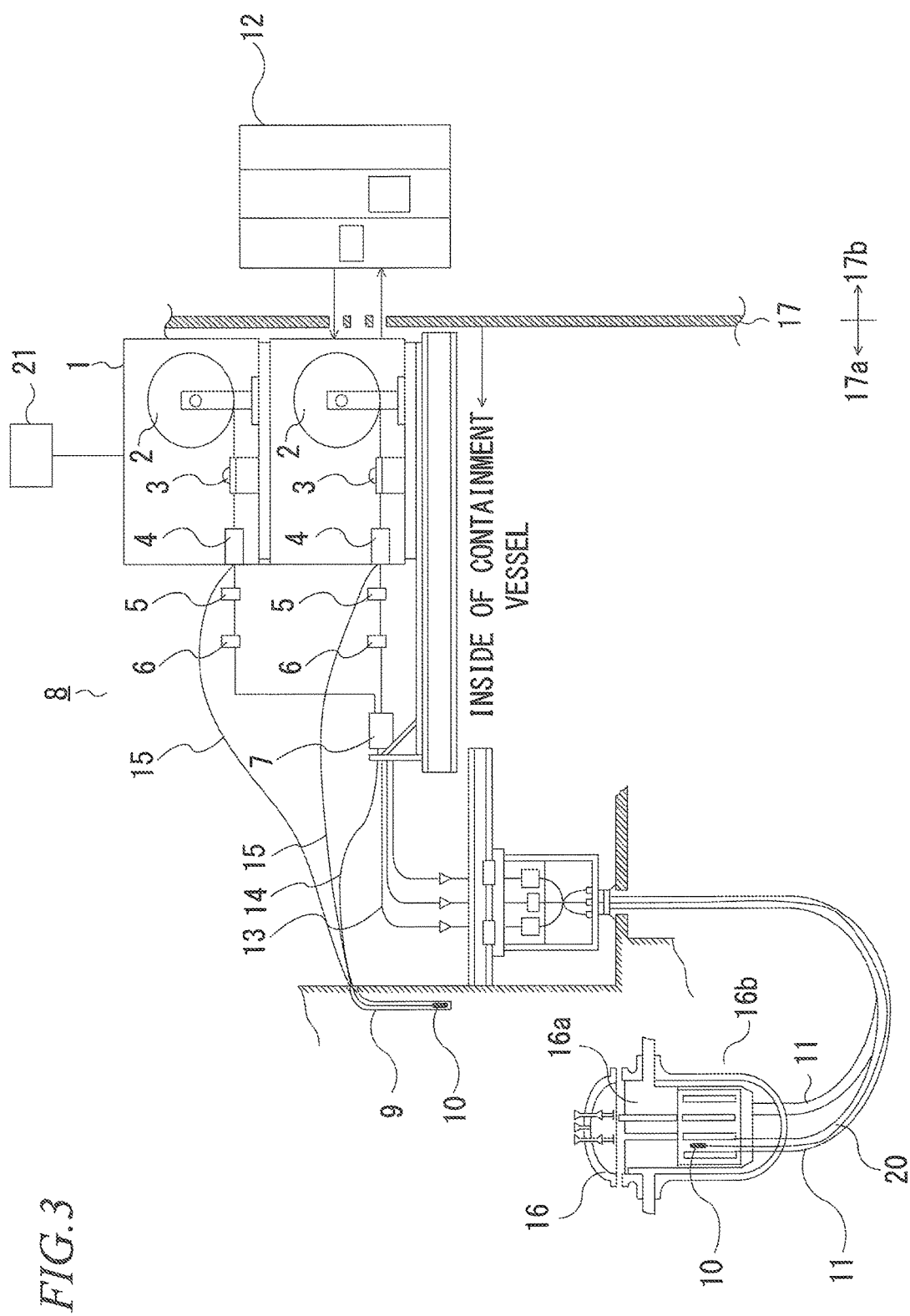
FIG. 3 is a diagram showing the configuration of a neutron flux mapping system according to the second embodiment of the present invention.

In the above first embodiment, an example of a single type where one drive unit is provided for one neutron detector has been described, but the present invention is not limited thereto. In the second embodiment, a dual type in which an auxiliary drive unit is provided will be described. FIG. 3 is a diagram showing the configuration of a neutron flux mapping system according to the second embodiment of the present invention. In FIG. 3, the same components as those of the above first embodiment are denoted by the same reference characters, and the description thereof is omitted. In the second embodiment, two drive units 1 having the same configuration as that of the above first embodiment are provided. Therefore, the inspection guide tubes 15 are respectively provided for connecting the drive units 1 and the storage tube 9. Further, the safety limit switches 5 and the withdrawal limit switches 6 as the path transfer device 8 are respectively connected to the drive units 1.

The control method for the neutron flux mapping system of the second embodiment configured as described above is performed in the same manner as in the above first embodiment, and if one of the drive units has broken down, the other one of the drive units can operate.

It is noted that, within the scope of the present invention, each embodiment may be modified or abbreviated as appropriate.

Various modifications and alterations of this invention will be apparent to those skilled in the art without departing from the scope and spirit of this invention, and it should be understood that this is not limited to the illustrative embodiments set forth herein.

What is claimed is:

1. A neutron flux mapping system placed inside a containment vessel, for detecting a neutron flux distribution of the inside of a reactor, the neutron flux mapping system comprising:
   a neutron detector for detecting the neutron flux distribution of the inside of the reactor;
   a drive cable connected to the neutron detector, for moving the neutron detector;
   a drive unit for driving the drive cable;
   a plurality of guide thimbles provided being inserted from the outside of the reactor into a plurality of sections inside the reactor, for respectively inserting the neutron detector into the plurality of sections inside the reactor;
   a storage tube for storing the neutron detector outside the reactor;
   a path transfer device connected to the drive unit, for selecting one of insertion of the neutron detector into each of the guide thimbles and insertion of the neutron detector into the storage tube;
   a storage guide tube connecting the path transfer device and the storage tube; and
   an inspection guide tube connecting the drive unit to the storage tube while bypassing the path transfer device, wherein
   the drive unit has a switching unit for switching a path to one of the path transfer device side and the inspection guide tube side.

2. The neutron flux mapping system according to claim 1, further comprising:
   a control cabinet provided outside the containment vessel, for controlling the drive unit, the path transfer device, and the switching unit; and
   a maintenance control unit provided inside the containment vessel, for controlling the drive unit, the path transfer device, and the switching unit upon inspection.

3. A control method for a neutron flux mapping system, the neutron flux mapping system including:
   a neutron detector for detecting a neutron flux distribution of the inside of a reactor;
   a drive cable connected to the neutron detector, for moving the neutron detector;
   a drive unit for driving the drive cable;
   a plurality of guide thimbles provided being inserted from the outside of the reactor into a plurality of sections inside the reactor, for respectively inserting the neutron detector into the plurality of sections inside the reactor;
   a storage tube for storing the neutron detector outside the reactor;
   a path transfer device connected to the drive unit, for selecting one of insertion of the neutron detector into each of the guide thimbles and insertion of the neutron detector into the storage tube;
   a storage guide tube connecting the path transfer device and the storage tube; and
   an inspection guide tube connecting the drive unit to the storage tube while bypassing the path transfer device, wherein
   the drive unit has a switching unit for switching a path to one of the path transfer device side and the inspection guide tube side,
   the control method comprising:
   a storage step of switching the path to the path transfer device side by the switching unit, selecting the storage guide tube by the path transfer device, and moving and storing the neutron detector into the storage tube via the storage guide tube by the drive cable;
   a movement step of moving the neutron detector into the drive unit via the path transfer device by the drive cable; and
   a preparation step of switching the path to the inspection guide tube side by the switching unit, moving the neutron detector into the storage tube via the inspection guide tube from the inside of the drive unit by the drive cable, and performing inspection preparation.

4. A control method for a neutron flux mapping system, the neutron flux mapping system including:
   a neutron detector for detecting a neutron flux distribution of the inside of a reactor;
   a drive cable connected to the neutron detector, for moving the neutron detector;
   a drive unit for driving the drive cable;
   a plurality of guide thimbles provided being inserted from the outside of the reactor into a plurality of sections inside the reactor, for respectively inserting the neutron detector into the plurality of sections inside the reactor;
   a storage tube for storing the neutron detector outside the reactor;
   a path transfer device connected to the drive unit, for selecting one of insertion of the neutron detector into each of the guide thimbles and insertion of the neutron detector into the storage tube;
   a storage guide tube connecting the path transfer device and the storage tube; and
   an inspection guide tube connecting the drive unit to the storage tube while bypassing the path transfer device, wherein
   the drive unit has a switching unit for switching a path to one of the path transfer device side and the inspection guide tube side,
   the neutron flux mapping system further including:
   a control cabinet provided outside the containment vessel, for controlling the drive unit, the path transfer device, and the switching unit; and
   a control unit for maintenance provided inside the containment vessel, for controlling the drive unit, the path transfer device, and the switching unit upon inspection,
   the control method comprising:
   a storage step of switching the path to the path transfer device side by the switching unit, selecting the storage guide tube by the path transfer device, and moving and storing the neutron detector into the storage tube via the storage guide tube by the drive cable;

a movement step of moving the neutron detector into the drive unit via the path transfer device by the drive cable; and a preparation step of switching the path to the inspection guide tube side by the switching unit, moving the neutron detector into the storage tube via the inspection guide tube from the inside of the drive unit by the drive cable, and performing inspection preparation, wherein control for the storage step is performed by the control cabinet, and control for the movement step and the preparation step is performed by the control unit for maintenance.

5. The control method for the neutron flux mapping system according to claim 3, further comprising: another movement step of, after the inspection is finished, moving the neutron detector into the drive unit via the inspection guide tube by the drive cable.

6. The control method for the neutron flux mapping system according to claim 4, further comprising: another movement step of, after the inspection is finished, moving the neutron detector into the drive unit via the inspection guide tube by the drive cable.

* * * * *